United States Patent [19]

Tomiki et al.

[11] 4,141,855
[45] * Feb. 27, 1979

[54] METHOD OF PRODUCING CERIUM-ACTIVATED PHOSPHOR OF IMPROVED CHARACTERISTIC

[75] Inventors: Tetsuhiko Tomiki; Takeshi Takeda; Takeo Miyata; Fumio Muramatsu, all of Kawasaki, Japan

[73] Assignee: Matsushita Electric Industrial Co., Ltd., Japan

[*] Notice: The portion of the term of this patent subsequent to Jan. 24, 1995, has been disclaimed.

[21] Appl. No.: 850,253

[22] Filed: Nov. 10, 1977

[30] Foreign Application Priority Data

Jun. 2, 1975 [JP] Japan .......................... 50-66824

Related U.S. Application Data

[63] Continuation-in-part of Ser. No. 691,784, Jun. 1, 1976, Pat. No. 4,070,301.

[51] Int. Cl.² ............................................ C09K 11/46
[52] U.S. Cl. .......................................... 252/301.4 R
[58] Field of Search .............................. 252/301.4 R

[56] References Cited

U.S. PATENT DOCUMENTS

| | | | |
|---|---|---|---|
| 2,590,411 | 3/1952 | Isenberg | 252/301.4 R X |
| 3,657,138 | 4/1972 | Royce | 252/301.4 R |

FOREIGN PATENT DOCUMENTS

| | | | |
|---|---|---|---|
| 2409953 | 9/1974 | Fed. Rep. of Germany | 252/301.4 F |
| 2624544 | 12/1976 | Fed. Rep. of Germany | 252/301.4 R |
| 49-3913 | 1/1974 | Japan | 252/301.4 R |
| 50-97590 | 8/1975 | Japan | 252/301.4 R |

*Primary Examiner*—Jack Cooper
*Attorney, Agent, or Firm*—Lowe, King, Price & Becker

[57] ABSTRACT

A phosphor expressed fundamentally as $YAlO_3:Ce$ is produced through baking under a usual condition of a mixture of $Y_2O_3$, $Al_2O_3$, $CeO_2$ and a controlled amount of barium compound exemplified by $BaCO_3$, $BaO$, $Ba(OH)_2$ and $BaF_2$. The presence of the barium compound in the mixture causes intensification of ultraviolet emission and/or suppression of the formation of blue-emitting $Y_3Al_5O_{12}:Ce$. The use of $BaF_2$ as the barium compound or partial replacement of at least one of $Y_2O_3$ and $Al_2O_3$ respectively by $YF_3$ and $AlF_3$ is favorable to the intensification of the ultraviolet emission.

6 Claims, 4 Drawing Figures

METHOD OF PRODUCING CERIUM-ACTIVATED PHOSPHOR OF IMPROVED CHARACTERISTIC

CROSS REFERENCE TO RELATED APPLICATION

This application is a continuation-in-part of application Ser. No. 691,784, filed June 1, 1976, now U.S. Pat. No. 4,070,301.

BACKGROUND OF THE INVENTION

This invention relates to a method of producing a cerium-activated yttrium orthoaluminate ($YAlO_3$) phosphor which emits ultraviolet radiation and has a short decay time.

Cerium-activated phosphors generally exhibit a very short emission decay time $\tau_{1/e}$, less than 100 nanoseconds, and accordingly have attracted much attention as favorable to flying-spot scanners and beam-indexing tubes. An emission spectrum extending over the entire range of visible part is required of a phosphor for flying-spot-scanners. For beam-indexing tubes, it is required of a phosphor that the peak wavelength $\lambda_{max}$ of its emission spectrum is within the range of about 340–400 nm.

Examples of commercial phosphors which meet, or nearly meet, these requirements are a $Ca_2MgSi_2O_7:Ce$ phosphor (designated as P16) whose emission spectrum has a peak $\lambda_{max}$ approximately at 370 nm, a $Y_3Al_5O_{12}:Ce$ phosphor (P46) whose $\lambda_{max}$ is approximately 540 nm, a $Y_2SiO_5:Ce$ phosphor (P47) with $\lambda_{max}$ at approximately at 410 nm and P48 which is a 70/30 mixture of P46 and P47.

$Y_2O_3$-$Al_2O_3$ system can present three different phases; $Y_3Al_5O_{12}$, $YAlO_3$ and $Y_4Al_2O_9$. Among phosphors given by activation of these yttriumaluminates by cerium, the most greatest interest has been attached to $Y_3Al_5O_{12}:Ce$(P46) because $Y_3Al_5O_{12}$ is the most stable among the three phases and can be obtained readily as a single phase through a simple solid state reaction.

Weber reported in J. of Appl. Phys., 44, 3205–3208 (1973) that the photoemission band of a single crystal of $YAlO_3:Ce$ prepared by the Czochralski method had a decay time $\tau_{1/e}$ of 16 nsec and a peak wavelength in the emission spectrum $\lambda_{max}$ of 370 nm. These values suggest that $YAlO_3:Ce$ phosphor is quite attractive as a beam-indexing phosphor. Some patent applications, e.g. Japanese Patent Application Disclosure No. 48(1973)-26686, have also disclosed $YAlO_3:Ce$ phosphor. Unlike $Y_3Al_5O_{12}$, however, $YAlO_3$ is a quasi-stable phase and requires some consideration of preparation techniques. Naka et al reported in Kogyo Kagaku Zasshi (Japan), 69, No. 6,1112–1116(1966) that, in the preparation of $YAlO_3$ from $Y_2O_3$ and $Al_2O_3$, there occurred coexistence of $Y_3Al_5O_{12}$ and $Y_4Al_2O_9$ even by the employment of a very severe baking condition such as 1500° C.-25 hr. The above-referred Japanese Pat. Appln. too shows the necessity of employing a baking temperature higher than 1550° C. for obtaining a $YAlO_3:Ce$ phosphor of a practicable performance. According to the results of our experiments on the production of $YAlO_3:Ce$ phosphor by solid state reaction, the coexisting $Y_3Al_5O_{12}:Ce$ phase lessens as the baking temperature is raised but does not disappear completely even through baking for 4 hr at 1600° C.

The coexistence of $Y_3Al_5O_{12}:Ce$ in $YAlO_3:Ce$ phosphor as an ultraviolet-emitting phosphor is particularly and significantly disadvantageous from the following reasons. First, $Y_3Al_5O_{12}:Ce$ emits visible light. Second, the excitation band of $Y_3Al_5O_{12}:Ce$ somewhat overlaps the emission band of $YAlO_3:Ce$ with the result that part of the ultraviolet radiation emitted by $YAlO_3:Ce$ is absorbed in $Y_3Al_5O_{12}:Ce$.

Concerning the production of $YAlO_3:Ce$ phosphor using $Y_2O_3$, $Al_2O_3$ and $CeF_3$ as starting materials, our above-referred application Ser. No. 691,784 has disclosed that a phosphor of improved luminous intensity can be obtained through baking at about 1000°–1400° C. by the addition of a controlled amount of barium compound, e.g. $BaCO_3$, $BaO$ or $BaF_2$, to the starting materials.

Japanses Patent Application Disclosure No. 49(1974)-113784, relating to $Y_2SiO_5:Ce$ phosphor, shows that the addition of $BaF_2$ to the starting materials for this phosphor causes an increase in the luminous intensity due to an intensification of radiation approximately at 450 nm while there occurs no enhancement of a main peak (approximately at 420 nm) of $Y_2SiO_5:Ce$. This means a change in the emission spectrum of $Y_2SiO_5:Ce$ by the use of $BaF_2$. For $YAlO_3:Ce$, we have confirmed that the use of a barium compound causes enhancement of its main peak (370 nm) without causing any change in the emission spectrum.

Japanese Patent Application Disclosure No. 50(1975)-45790 relating to $Y_2Si_2O_7:Ce$ shows an increase in the luminous intensity caused by the use of $BaF_2$. As is known, $Y_2Si_2O_7$ has four crystallographic modifications; $\alpha$, $\beta$, $\gamma$ and $\delta$. This Japanese application describes that the use of $BaF_2$ is effective for obtaining a single phase of $\beta$-$Y_2Si_2O_7:Ce$ which exhibits the most intense emission.

Since $YAlO_3$ has only one crystallographic structure, the effect of $BaF_2$ on $YAlO_3:Ce$ phosphor shown in our application Ser. No. 691,784 differs in nature or principle from that on $Y_2Si_2O_7:Ce$ phosphor.

For $Y_3Al_5O_{12}:Ce$, we have recognized through later studies that the addition of a barium compound to commonly used starting materials produces a suppressive effect on the formation of $Y_3Al_5O_{12}:Ce$ by baking. When no barium compound was added, pure $Y_3Al_5O_{12}:Ce$ phase was obtained at baking temperatures above about 1300° C. and baking at lower temperatures resulted in the coexistence of $YAlO_3:Ce$ phase. When a few mole% barium compound was added to the same starting materials, the coexistence of $YAlO_3:Ce$ phase did not expire even at baking temperatures somewhat above 1300° C., so that it was necessary to raise the baking temperature at least to 1400° C. for obtaining pure or nearly pure $Y_3Al_5O_{12}:Ce$ phase.

SUMMARY OF THE INVENTION

It is an object of the present invention to provide a method of producing $YAlO_3:Ce$ phosphor, which method is effective for suppressing the formation of $Y_3Al_5O_{12}:Ce$ phase and gives a phosphor of an improved emission characteristic.

It is another object of the invention to provide a method of producing $YAlO_3:Ce$ phosphor which features an intensified ultraviolet emission.

According to a method of the invention, an improved $YAlO_3:Ce$ phosphor is produced fundamentally by the steps of (a) preparing a substantially stoichiometric mixture of powdered $Y_2O_3$, $Al_2O_3$, and $CeO_2$, (b) adding a controlled amount of a powdered barium compound to the above mixture, and (c) baking the resultant mixture at a temperature in the range from about 1000° to about 1400° C.

In practice, the steps (a) and (b) may be accomplished simultaneously. Alternatively, the mixture prepared at step (a) may be baked at a temperature below about 1150° C. and then pulverized prior to step (b).

Barium compounds useful in a method of the invention are BaO, $BaCO_3$, $BaF_2$, $BaCl_2$, and barium salts such as $Ba(OH)_2$, $Ba(NO_3)_2$ and $BaC_2O_4$ which give BaO at temperatures below 1400° C. The amount of the barium compound in step (b) is preferably made to range from 0.1 to 8 mole% of the stoichiometric mixture in step (a). Usually a range from about 0.5 to about 5 mole% is the most advantageous. However, it is permissible to increase the amount of the barium compound up to 20 mole% of the $Y_2O_3$-$Al_2O_3$-$CeO_2$ mixture accompanied by an additional step of washing the product of step (c) with an acid, preferably a dilute nitric acid.

The amount of $CeO_2$ is made such that the Ce concentration in the produced phosphor ranges from 0.1 to 5 mole% of the host material, $YAlO_3$, as in conventional $YAlO_3$:Ce phosphors.

Judging from X-ray diffraction pattern of the product of a method of the invention, the product is not always a perfectly single phase of $YAlO_3$:Ce. Sometimes the coexistence of $BaAl_2O_4$ together with $Y_2O_3$ and/or $Y_4Al_2O_9$ is observed other than $Y_3Al_5O_{12}$:Ce. However, the use of a barium compound is quite effective for suppressing the formation of $Y_3Al_5O_{12}$:Ce which is very detrimental to an ultraviolet-emitting phosphor is explained hereinbefore. The coexisting phases other than $YAlO_3$:Ce and $Y_3Al_5O_{12}$:Ce can readily be removed by washing the product with an acid such as a dilute nitric acid. It is necessary that barium is mixed with the essential materials ($Y_2O_3$, $Al_2O_3$ and $CeO_2$) in the form of one of the above listed compounds. Substantially no improvement on the emission characteristic of the product can be accomplished if barium is introduced in the form of a barium aluminate such as $BaAl_2O_4$.

The $YAlO_3$:Ce phosphor produced according to the invention includes less $Y_3Al_5O_{12}$:Ce than analogous phosphors produced by conventional methods and hence features a remarkable lowering in the luminous intensity of radiation in the visible part of the emission spectrum. Furthermore, there occurs in many cases a considerable intensification of the ultraviolet emission attributable to $YAlO_3$:Ce. In regard of the intensification of the ultraviolet emission, it is preferable that the mixture prepared at step (b) contains a fluoride. This is realized by the use of $BaF_2$ in an amount as specified hereinbefore as the barium compound. Alternatively (or at the same time), a portion of $Y_2O_3$ may be replaced by $YF_3$ and/or a portion of $Al_2O_3$ may be replaced by $AlF_3$. In this case, it is preferable that either of the molar ratios $2YF_3/Y_2O_3$ and $2AlF_3/Al_2O_3$ is within the range from 0.001 to 0.10. When both $YF_3$ and $AlF_3$ are used, the sum of the molar ratios $2YF_3/Y_2O_3$ and $2AlF_3/Al_2O_3$ is made to range from 0.001 to 0.10.

DESCRIPTION OF PREFERRED EMBODIMENTS

EXAMPLE 1

Figure 1:
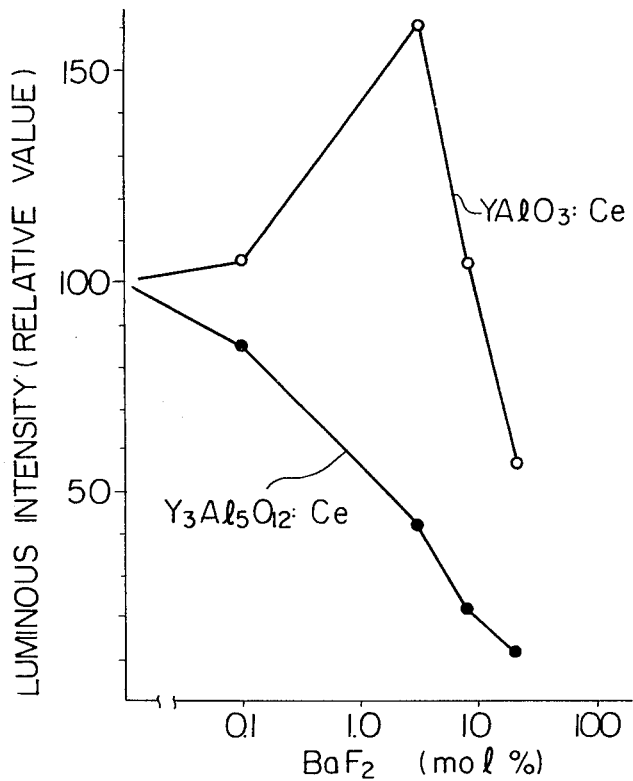
FIG. 1 is a graph showing the dependence of the intensities of ultraviolet emission and yellow emission of a cerium-activated yttriumaluminate phosphor on the amount of a barium compound added to the starting materials of the phosphor.

The following compounds were employed as the starting materials of a cerium-activated yttriumaluminate phosphor and weighed in the following proportion with correction for ignition losses.

| | |
|---|---|
| $Y_2O_3$ (99.99% purity) | 0.4975 moles |
| $Al_2O_3$ (99.99%) | 0.500 moles |
| $CeO_2$ (99.99%) | 0.0050 moles |
| $BaCO_3$ (special class reagent grade) | X moles |

The value for x was taken as 0 and 0.03 to produce two kinds of phosphors.

The weighed materials were mixed in ethanol for about 20 hr by means of a ball mill. After drying, the mixture was fired at a temperature of 1300° C. in a platinum cruicible (in air) for 4 hr to give a phosphor.

Each phosphor thus produced had an emission in the yellow part of the spectrum attributable to $Y_3Al_5O_{12}$:Ce other than ultraviolet emission attributable to $YAlO_3$:Ce. To examine luminous intensities of these two types of emissions individually, a HOYA U360 filter which cuts off visible light was interposed between an aluminum plate coated with each phosphor and the photosensitive surface of a photomultiplier tube for measurement of the ultraviolet emission and a TOSHIBA V-Y360 filter which cuts off ultraviolet for measurement of the yellow emission. The aluminum plate was irradiated with a 10 kV electron beam in a demountable irradiation apparatus.

The phosphor obtained when $BaCO_3$ was not contained in the starting materials (x = 0) was taken as a standard, and the luminous intensity of this phosphor was given the value of 100 for either of the ultraviolet and yellow emissions. Then, the intensity of the ultraviolet emission of the other phosphor (obtained when x = 0.03, meaning the addition of 3 mole% $BaCO_3$ to the essential materials of the cerium-activated phosphor) was 99 and the yellow emission intensity of this phosphor was 66. Thus, the presence of $BaCO_3$ in the materials subjected to baking caused a manifest lowering in the yellow emission attributable to $Y_3Al_5O_{12}$:Ce substantially without affecting the ultraviolet emission intensity of $YAlO_3$:Ce, so that the resultant phosphor was of an improved performance as an ultraviolet-emitting phosphor.

EXAMPLE 2

This example is generally similar to Example 1 except for the use of a high purity BaO in place of $BaCO_3$. A phosphor obtained by the incorporation of 3 mole% BaO (x = 0.03 according to the definition in Example 1) gave a relative value 102 on the same basis as in Example 1 for the intensity of the emission attributable to $YAlO_3$:Ce and a considerably small value, 53, for that attributable to $Y_3Al_5O_{12}$:Ce.

EXAMPLE 3

This example too is generally similar to Example 1 except that $BaCO_3$ was replaced by the same amount (3 mole%) of $Ba(OH)_2$. The relative intensity of the ultraviolet emission (of $YAlO_3$:Ce) was 100 and that of the yellow emission (of $Y_3Al_5O_{12}$:Ce) was 95 for a phosphor obtained by the use of $Ba(OH)_2$.

EXAMPLE 4

Use was made of $Ba(NO_3)_2$ in place of $BaCO_3$ in Example 1. When the starting materials contained 3 mole% $Ba(NO_3)_2$, meaning $x = 0.03$, the resultant phosphor gave a relative value 104 for the intensity of the ultraviolet emission and 80 for the yellow emission.

EXAMPLE 5

This example is generally similar to Example 1, but $BaF_2$ was used in place of $BaCO_3$ and the value for $x$ (moles $BaF_2$) was made 0.001, 0.030, 0.080 and 0.20. The luminous intensities of the resultant four kinds of phosphors were as follows on the same basis as in Example 1.

| | |
|---|---|
| $x = 0.001$ (0.1 mole% $BaF_2$) : | 105 (ultraviolet emission) and 85 (Yellow emission) |
| $x = 0.030$ (3 mole% $BaF_2$) : | 161 (ultraviolet) and 42 (yellow) |
| $x = 0.080$ (8 mole% $BaF_2$) : | 104 (ultraviolet) and 22 (yellow) |
| $x = 0.020$ (20 mole% $BaF_2$) : | 57 (ultraviolet) and 11 (yellow) |

These values are graphically presented in FIG. 1.

When the phosphor obtained by the use of 20 mole% $BaF_2$ was washed with a dilute nitric acid (5 N), the luminous intensity values increased to 98 (ultraviolet) and 18 (yellow).

EXAMPLE 6

A portion of $Y_2O_3$ in the starting materials of Example 1 was replaced by $YF_3$ (99.99% purity) to provide the following mixing ratio.

| | | |
|---|---|---|
| $Y_2O_3$ | 0.485 | moles |
| $YF_3$ | 0.020 | moles |
| $Al_2O_3$ | 0.500 | moles |
| $CeO_2$ | 0.010 | moles |
| $BaCO_3$ | x | moles |

Four kinds of phosphors were produced through the procedures of Example 1 by setting the value for x at 0, 0.001, 0.03 and 0.10. Evaluating the luminous intensity of the phosphor obtained without using $BaCO_3$ ($x = 0$) as 100 for either of the ultraviolet emission attributable to $YAlO_3$:Ce and the yellow emission attributable to $Y_3Al_5O_{12}$:Ce, the luminous intensities of the other three kinds of phosphors were as follows.

| | |
|---|---|
| $x = 0.001$ (0.1 mole% $BaCO_3$) : | 100 (ultraviolet) and 93 (yellow) |
| $x = 0.030$ (3 mole% $BaCO_3$) : | 131 (ultraviolet) and 70 (yellow) |
| $x = 0.10$ (10 mole% $BaCO_3$) : | 84 (ultraviolet) and 37 (yellow) |

Figure 2:
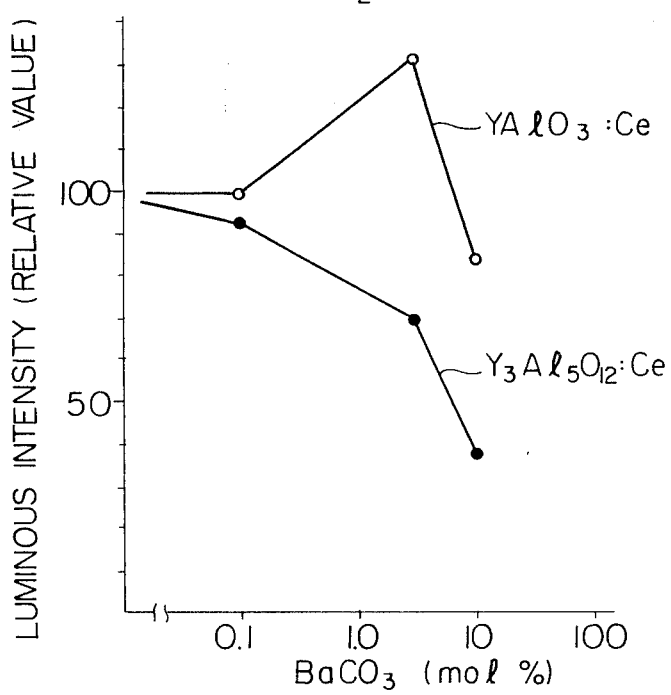
FIG. 2 is a graph showing the same as FIG. 1 except for some changes in the raw materials.

FIG. 2 presents these date in graphic form.

EXAMPLE 7

Using the $YF_3$-containing mixture of Example 6 with a fixed value 0.030 for x (3 mole% $BaCO_3$), the baking temperature was varied within the range of 1000°–1400° C. to examine the influence of the baking temperature on the luminous intensity of the product. The baking time was constantly 4 hr at every temperature. The same experiment was conducted also in the case of $x = 0$.

Figure 3:
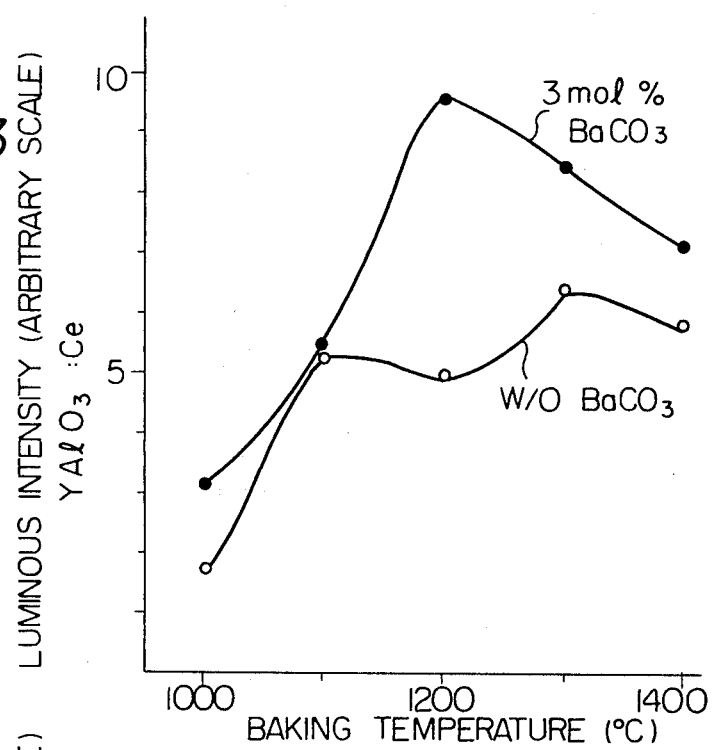
FIG. 3 is a graph showing the dependence of the intensity of ultraviolet emission of a cerium-activated yttriumaluminate phosphor on the baking temperature in the production of the phosphor by a method of the invention in comparison with the same resulting from a conventional production method.
Figure 4:
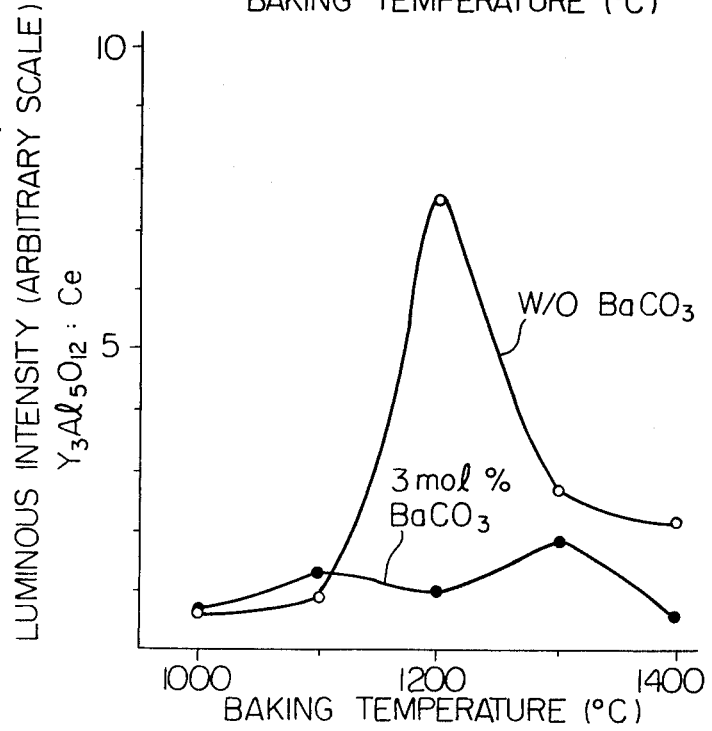
FIG. 4 is a graph similar to FIG. 3 with respect to yellow emission of the same phosphor.

The experimental results are graphically presented in FIGS. 3 and 4 for the ultraviolet emission ($YAlO_3$:Ce) and the yellow emission ($Y_3Al_5O_{12}$:Ce), respectively.

FIGS. 3 and 4 show that there is a difference between $YAlO_3$:Ce and $Y_3Al_5O_{12}$:Ce in the dependence of their luminous intensity on the baking temperature, that both intensification of the ultraviolet emission of $YAlO_3$:Ce and suppression of the yellow emission of $Y_3Al_5O_{12}$:Ce caused by the presence of $BaCO_3$ in the starting materials exhibit variations in scale as the baking temperature is varied and that, in this case, the merit of using $BaCO_3$ is appreciable at baking temperatures above 1100° C. As is known, the influence of the baking temperature on the performance of yttriumaluminate phosphor must be considered in correlation with the baking time. In many cases, a phosohor produced through baking for relatively long period of time at a relatively low temperature and another phosphor of the same composition produced through baking for a shorter period of time but at a higher temperature have analogous characteristics. When, for example, each composition of Example 7 was baked at 1100° C. for 10 hr, the luminous intensities of the resulting phosphors for the emissions attributable to $YAlO_3$:Ce and $Y_3Al_5O_{12}$:Ce were approximately equal to the values found on the curves of FIGS. 3 and 4, respectively, at a baking temperature of 1150° C.

EXAMPLE 8

Referring to Example 6, the proportion of $BaCO_3$ was fixed at 0.030 moles (3 mole%) and the amount of $YF_3$ was varied as follows.

| | | |
|---|---|---|
| $Y_2O_3$ | 0.495 − α/2 | moles |
| $YF_3$ | α | moles |
| $Al_2O_3$ | 0.50 | moles |
| $CeO_2$ | 0.010 | moles |
| $BaCO_3$ | 0.030 | moles |

The value for α was made 0, 0.001, 0.005, 0.010, 0.10 and 0.20 to produce six kinds of phosphors. The baking of each mixture was performed for 4 hr at 1300° C.

The luminous intensities of these phosphors were measured in accordance with Example 1, and the value 100 was given to the luminous intensity of the phosphor obtained without using $YF_3$ (α = 0) for either of the emission of $YAlO_3$:Ce and that of $Y_3Al_5O_{12}$:Ce. Then the relative values for the luminous intensities of the other phosphors were as follows.

| | |
|---|---|
| α = 0.001 (0.1 mole% $YF_3$) : | 105 (ultraviolet emission) and 55 (yellow emission) |
| α = 0.005 (0.5 mole% $YF_3$) : | 121 (ultraviolet) and 83 (yellow) |
| α = 0.010 (1 mole% $YF_3$) : | 131 (ultraviolet) and 100 (yellow) |
| α = 0.10 (10 mole% $YF_3$) : | 133 (ultraviolet) and 114 (yellow) |
| α = 0.20 (20 mole% $YF_3$) : | 80 (ultraviolet) and |

| | |
|---|---|
| | 154 (yellow) |

As seen from these data, the use of an increasing amount of $YF_3$ brings about a progressive intensification of both the ultraviolet and yellow emissions, but the ultraviolet emission alone is significantly suppressed when the amount of $YF_3$ exceeds about 10 mole% of $Y_2O_3$. A great intensification of the yellow emission by the use of a large amount of $YF_3$ was confirmed by an experimental result that a phosphor obtained by excluding $BaCO_3$ from the above composition and setting α at 0.20 exhibited luminous intensity of 90 for the ultraviolet emission and 389 for the yellow emission. This example demonstrates the preferableness of using $YF_3$ in an amount of about 0.1 to about 10 mole% of $Y_2O_3$.

EXAMPLE 9

A composition of the following mixing ratio was employed in this example to examine the replacement of a portion (about 4 mole%) of $Al_2O_3$ by $AlF_3$.

| | | |
|---|---|---|
| $Y_2O_3$ | 0.495 | moles |
| $Al_2O_3$ | 0.490 | moles |
| $AlF_3$ | 0.020 | moles |
| $CeO_2$ | 0.10 | moles |
| $BaCO_3$ | X | moles |

The value for x was taken as 0 and 0.03 to produce two kinds of phosphors through baking at 1300° C. for 4 hr.

When x = 0.03 (3 mole% $BaCO_3$), the luminous intensities of the resultant phosphor were 124 for the emission of $YAlO_3$:Ce and 49 for the emission of $Y_3Al_5O_{12}$:Ce, evaluating the luminous intensities of the other phosphor (x = 0) as 100.

EXAMPLE 10

$Y_2O_3$, $Al_2O_3$ and $CeO_2$ were weighed in the proportion given in Example 1 (excluding $BaCO_3$) and mixed in ethanol according to Example 1. This mixture was baked in a platinum crucible at 1000° C. for 4 hr and then cooled to room temperature, followed by pulverizing. $BaF_2$ was added to the heat-treated and powdered mixture in four different amounts as employed in Example 5 (0.1 to 20 mole%), and each of the resultant mixtures was baked for 4 hr at 1300° C. The emission characteristics of the thus produced phosphors were substantially identical with those of the corresponding phosphors produced in Example 5.

EXAMPLE 11

This example illustrates a joint use of $YF_3$ and $AlF_3$ in combination with $Y_2O_3$ and $Al_2O_3$. The following materials were mixed in the indicated proportion by the procedure of Example 1 and baked for 4 hr at 1300° C.

| | | |
|---|---|---|
| $Y_2O_3$ | 0.480 | moles |
| $YF_3$ | 0.030 | moles |
| $Al_2O_3$ | 0.485 | moles |
| $AlF_3$ | 0.030 | moles |
| $CeO_2$ | 0.010 | moles |
| $BaCO_3$ | 0 or 0.03 | moles |

Taking the luminous intensities of the phosphor produced without using $BaCO_3$ as 100, the luminous intensities of the phosphor obtained by the use of $BaCO_3$ were 132 for the ultraviolet emission and 17 for the yellow emission. The replacement of $BaCO_3$ in this example by the same quantity (0.03 moles) of $BaF_2$ produced little change in the emission characteristic of the product. In this case the luminous intensity for the ultraviolet emission was 139 and that for the yellow emission was 20.

What is claimed is:

1. A method of producing a $YAlO_3$:Ce phosphor, comprising the steps of:
   a. preparing a mixture of $Y_2O_3$, $Al_2O_3$ and $CeO_2$, the molar ratio of $Y_2O_3$ to $Al_2O_3$ being substantially 1:1, the amount of $CeO_2$ being such that cerium in said phosphor amounts to 0.1 to 5 mole% of $YAlO_3$;
   b. adding a barium compound selected from the group consisting of BaO, $BaCO_3$, $BaF_2$, $BaCl_2$ and barium salts which yield BaO at a temperature below 1400° C. to said mixture in an amount of 0.1 to 20 mole% of said mixture;
   c. baking the resultant mixture at a temperature in the range from about 1000° to about 1400° C.; and
   d. washing the product of step (c) with an acid when said amount of said barium compound is larger than 8 mole%.

2. A method as claimed in claim 1, wherein said salts are $Ba(OH)_2$, $Ba(NO_3)_2$ and $BaC_2O_4$.

3. A method as claimed in claim 1, further comprising the step of baking said mixture prepared at step (a) at a temperature below about 1150° C. and then pulverizing the baked mixture prior to step (b).

4. A method of producing a $YAlO_3$:Ce phosphor, comprising the steps of:
   a. preparing a mixture of $Y_2O_3$, $Al_2O_3$, $CeO_2$ and at least one of $YF_3$ and $AlF_3$, the molar ratio of ($2YF_3 + Y_2O_3$) to ($2AlF_3 + Al_2O_3$) being substantially 1:1, with the molar ratios $2YF_3/Y_2O_3$ and $2AlF_3/Al_2O_3$ being each in the range from 0.001 to 0.10 when $YF_3$ or $AlF_3$ is present, or with the sum of the molar ratios $2YF_3/Y_2O_3$ and $2AlF_3/Al_2O_3$ being in the range from 0.001 to 0.10 when both $YF_3$ and $AlF_3$ are present; the amount of $CeO_2$ being such that cerium in said phosphor amounts to 0.1 to 5 mole% of $YAlO_3$;
   b. adding a barium compound selected from the group consisting of BaO, $BaCO_3$, $BaF_2$, $BaCl_2$ and barium salts which yield BaO at a temperature below 1400° C. to said mixture in an amount of 0.1 to 20 mole% of said mixture;
   c. baking the resultant mixture at a temperature in the range from about 1000° to about 1400° C.; and
   d. washing the product of step (c) with an acid when said amount of said barium compound is larger than 8 mole%.

5. A method as claimed in claim 4, wherein said barium salts are $Ba(OH)_2$, $Ba(NO_3)_2$ and $BaC_2O_4$.

6. A method as claimed in claim 4, further comprising the step of baking said mixture prepared at step (a) at a temperature below about 1150° C. and then pulverizing the baked mixture prior to step (b).

* * * * *